United States Patent [19]

Karolek et al.

[11] Patent Number: 4,932,443

[45] Date of Patent: Jun. 12, 1990

[54] METHOD AND APPARATUS FOR APPLYING PASTE TO BATTERY GRIDS

[75] Inventors: Neil C. Karolek, Cudahy; William H. Rietz, Menomonee Falls, both of Wis.

[73] Assignee: Globe-Union Inc., Milwaukee, Wis.

[21] Appl. No.: 341,366

[22] Filed: Apr. 21, 1989

[51] Int. Cl.$^5$ .............................................. H01M 4/20
[52] U.S. Cl. ........................................ 141/1.1; 141/32; 141/33; 141/89; 141/125; 141/280; 29/2; 29/623.1; 29/623.3; 29/623.5
[58] Field of Search ...................... 141/1.1, 32, 33, 89, 141/129, 125, 280; 29/2, 623.1, 623.3, 623.5

[56] References Cited

U.S. PATENT DOCUMENTS

| | | | |
|---|---|---|---|
| 2,382,367 | 8/1945 | Donath | 141/32 |
| 2,385,277 | 9/1945 | Hatfield | 141/32 |
| 2,680,547 | 6/1954 | Donath | 141/32 |
| 2,840,120 | 6/1958 | Lund | 141/32 |
| 2,949,940 | 8/1960 | Lozo | 141/32 |
| 4,606,383 | 8/1986 | Yanik | 141/32 |

FOREIGN PATENT DOCUMENTS 647167 11/1928 France ................................ 141/33

OTHER PUBLICATIONS

Copies of pp. 33, 34 and 35 from brochure entitled "JCI Paster-Self Study Leader's Guide", (no date).

Primary Examiner—Ernest G. Cusick
Attorney, Agent, or Firm—Foley & Lardner

[57] ABSTRACT

A method and apparatus for applying paste to a battery grid. An endless conveyor belt pulls a grid through a pasting zone where paste is impressed into the grid. The grid is further passed through a fixed orifice, after being impressed with paste to impart a predetermined thickness to the grid. The orifice may be defined by two plates.

20 Claims, 4 Drawing Sheets

METHOD AND APPARATUS FOR APPLYING PASTE TO BATTERY GRIDS

BACKGROUND OF THE INVENTION

1. Technical Field

The present invention relates, generally, to methods and apparatus for applying a viscous substance to thin, flat sheets, and, more particularly, to an improved method of applying a uniform coating of electrochemically active paste to electric storage battery grids.

2. Background Art and Technical Problems

Lead storage batteries typically comprise a series of thin, flat, generally rectangular grids for carrying current through the battery. The grids also serve as a substrate for supporting the electrochemically active material, or paste, deposited thereon during manufacture. The paste typically comprises a mixture of lead oxide and a dilute acid solution, for example sulfuric acid. Paste composition is determined by, inter alia, power requirements, cost, and battery environment, as is known in the art.

Grids are desirably screenlike, having a matrix or honeycomb pattern of alternating metal strips and open spaces. The paste is deposited upon both surfaces of the grid, completely filling the spaces between the alternating strips ("interstitial spaces"). The pasted grids are then dried and assembled into a battery housing, whereupon the housing is sealed and filled with aqueous electrolyte.

Current flows through the pasted grids during the charge and discharge phases of battery operation. It has been observed that nonuniform current density within a battery creates localized volume expansion within the grids, causing the active material (paste) to buckle or crumble. Maintenance of uniform current distribution through the mass of active material (paste) requires that each grid support an equal amount of paste. It is, therefore, important that the paste be uniformly distributed onto the surfaces and within the interstitial spaces of the grids. Thus, an efficient method of producing pasted grids with consistent thickness dimensions is needed.

Grid pasting machines for applying a uniform coating of electrochemically active paste to lead battery grids are generally well known. For example, in the JCI Paster, Model #24727, made by Butler Tool Co. of Butler, Wis. 53007, grids are introduced into a pasting zone via a conveyor system of horizontally mounted cylindrical rollers. The pasting zone comprises the region between a pair of parallel flat plates. As each grid passes between the plates, paste is continuously fed into the pasting zone through a transverse slot in the upper plate. The paste enters the pasting zone under sufficient pressure to fill all interstitial spaces within the grid and completely coat both grid surfaces with paste.

The pasted grid is thereafter carried through a fixed orifice, comprising the sizing portion of the pasting zone, wherein the plates are spaced apart by an amount equal to the desired thickness of a pasted grid, and subsequently discharged from the paster machine.

Pressurized application of paste to the upper surface of the grids forces paste into and through the interstitial spaces of the grid. Consequently, the grids do not contact the orifice plates as the grids move through the sizing portion thereof. Rather, the pasted grids glide through the sizing orifice, there being a cushion of paste between the grid and each plate surface.

The rate at which paste is introduced into the pasting zone is selected such that a greater volume of paste is applied to each grid than is ultimately required on a completed pasted grid. In this way, excess paste is necessarily removed from the grid in the sizing orifice, thus minimizing the potential for undersized pasted grids.

Grids are typically introduced into the pasting zone either in the form of a continuous web, for subsequent cutting into individual segments, or in discrete units of one, two or four grids. In either case, each grid is pushed into the pasting zone in abutting relation to the upstream grids. An initial pair of drive wheels, similar to the ones protruding from the orifice plates, may be disposed near the entrance of the orifice plates for pushing the grids into the pasting zone. Consequently, the ease with which a grid may be pushed through the orifice plates, and particularly through the pinch point of the paste application zone, is a function of the beam strength of the grid. In this context, beam strength refers to the ability of a thin, flat grid to withstand compressive forces, particularly those applied in the plane of the grid as it is pushed through the pasting machine. Insufficient beam strengh results in grid buckling, which requires shutting down the machine to clear the resulting obstruction.

Depending upon, for example, voltage and current requirements of a particular battery, the thickness of the unpasted grids may vary. Relatively thick grids exhibit high beam strength. As the thickness of a grid decreases, a corresponding reduction in beam strength results.

Other factors contribute to lower grid beam strength such as, for example, the use of softer alloys, screen pattern design, and the temperature of the grid. In particular, when a web of grid material is produced by a continuous casting process, productivity may often be enhanced by disposing the grid casting apparatus adjacent the infeed conveyor of the pasting machine so that the grid web flows directly from the casting machine into the pasting machine. Freshly cast grids, having an elevated temperature, generally exhibit decreased beam strength.

It is generally known to carry, rather than push, a grid through the pasting zone to avoid buckling. See, for example, Yanik U.S. Pat. No. 4,606,383, issued Aug. 19, 1986, the disclosure of which is hereby incorporated by reference. This is accomplished by using a conveyor belt to "pull" the grids into and through the pasting zone. High pressure application of the paste to the grid, however, tends to cause the moist paste to adhere to the surface of the conveyor belt. One technique for preventing adherence involves inserting a web of paper between the grids and the belt. In this way, the pasted grid will adhere to the paper, thus facilitating a smooth transfer of the pasted grid and paper from the belt. Although the presence of the paper on one or both surfaces of a pasted grid does not adversely affect the electrochemical performance of the completed battery, paper presents awkward and expensive production and handling problems.

Another disadvantage of presently known belt drive pasting machines is that the belt functions as the bottom orifice plate. Inasmuch as belt thickness can vary considerably along the length of the belt, the orifice thickness dimension varies accordingly. Furthermore, this variation is exacerbated over time as the belt is worn and stretched during use. A variable orifice dimension results in poor repeatability of pasted grid thickness dimensions.

SUMMARY OF THE INVENTION

The present invention provides methods and apparatus for application of paste to either a continuous web or discrete units of battery grids in a manner which enhances the repeatability of pasted grid thickness dimensions and reduces the incidence of grid buckling during pasting. A preferred embodiment of the present invention provides an endless conveyor belt for pulling the grids through the pasting zone, particularly through the region in which paste is impressed onto the grid, thus alleviating the problem of low beam strength grid buckling. After pulling a grid into the paste application region, the belt descends into a transverse slot in the lower orifice plate while the overpasted grid is directed through the remaining portion of the space between the orifice plates and appropriately sized. This belt configuration eliminates orifice variations due to belt thickness variations by eliminating the presence of the belt from within the sizing orifice, resulting in pasted grids of uniform thickness.

Furthermore, the leading edge of the sizing region of the lower orifice plate, corresponding to the downstream edge of the lower transverse slot, separates the grid from the belt as the belt leaves the pasting region, thus eliminating the need for a paper insert between the belt and the grids.

Various aspects of the present invention are particularly advantageous inasmuch as they may be implemented in the context of a conventional pasting machine, modified in accordance herewith.

BRIEF DESCRIPTION OF THE DRAWING

A preferred exemplary embodiment of the present invention will hereinafter be described in conjunction with the appended drawing, wherein like numerals denote like elements, and.

DETAILED DESCRIPTION OF A PREFERRED EXEMPLARY EMBODIMENT

Figure 1:
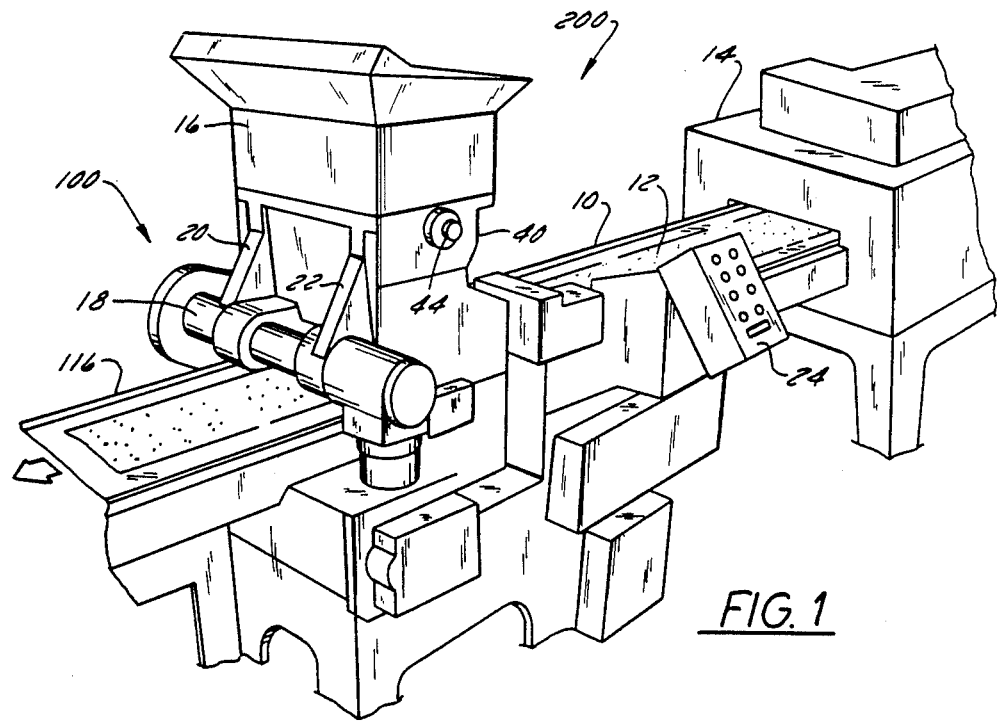
FIG. 1 is a perspective view of a continuous feed belt pasting machine in accordance with one aspect of the invention.

Referring to FIG. 1, an exemplary grid pasting assembly 200 for pasting lead storage battery grids generally comprises a pasting machine 100, a continuous casting machine 14, and a grid infeed conveyor 10 for carrying unpasted grids 12 from casting machine 14 to pasting machine 100. Casting machine 14 advantageously casts a continuous web of grids which, after pasting, are cut into individual grids by a cutter (not shown). Alternatively, conveyor 10 may introduce grids 12 into paster 100 in successive repeat units of one, two, or four grid segments, for example.

Pasting machine 100 suitably includes a hopper 16 into which prepared paste (not shown in FIG. 1) is introduced for subsequent application to grids 12. Hopper 16 is pivotally mounted about a pivot axis 18 by respective brackets 20, 22. Hopper 16 may be pivoted about axis 18, thereby selectively exposing the inside of the machine to facilitate maintenance and clearing of obstructions, as needed. Paste is urged from hopper 16, through a chute 40, and into the pasting zone by a paddle wheel 42 (not shown in FIG. 1; see FIG. 3) rotatably mounted about an axis 44. A control box 24 allows the operator to control various operating parameters such as, for example, conveyor speed, emergency shutoff, etc.

Unpasted grids are introduced into pasting machine 100 via infeed conveyor 10, and pulled into a pasting zone. After paste is applied, the grids are urged through a fixed orifice to "size" the pasted grids, thus ensuring a uniform thickness dimension for each pasted grid.

Figure 2:
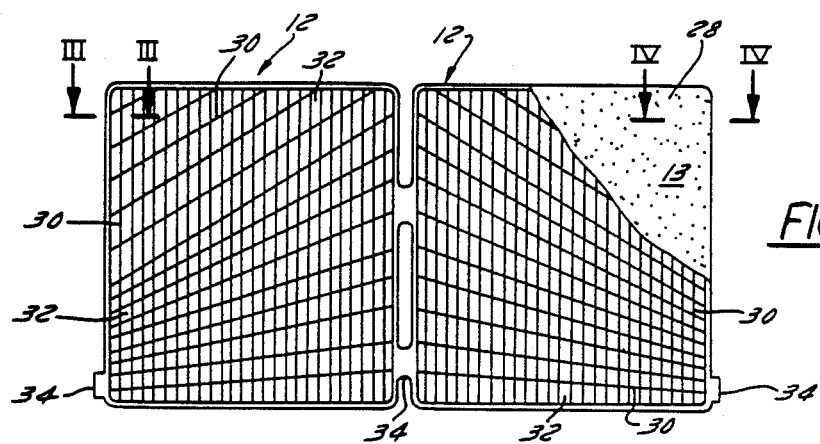
FIG. 2 is a top plan view of a pair of grids, a portion of one being shown in the pasted condition.
Figure 3:
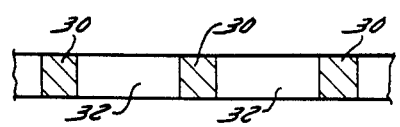
FIG. 3 is a cross-section view of an unpasted grid taken along line III—III of FIG. 2.
Figure 4:
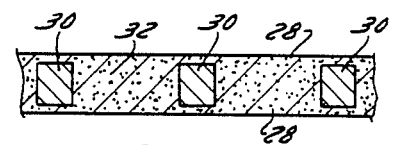
FIG. 4 is a cross-section view of a pasted grid taken along line IV—IV of FIG. 2.

Referring now to FIGS. 2-4, each battery grid 12 comprises a screenlike pattern or matrix of respective strips of lead 30 defining respective open spaces (interstitial spaces) 32 therebetween. One or more tabs 34 are desirably disposed about the periphery of each grid 12 to facilitate handling and subsequent assembly of the pasted grids into a battery housing. A portion 13 of grid 12 is shown in the pasted condition, i.e., after a coating of paste 28 has been applied to the grid.

As grids 12 pass through the pasting zone in pasting machine 100, paste 28 is applied to the top flat surface of each grid under sufficient pressure to completely fill all interstitial spaces 32. Paste 28 is urged through spaces 32, thereby coating the bottom side of each grid 12. In effect, each grid 12 is inserted into a "stream" of paste 28. In a preferred embodiment, it is desirable to apply more paste than is ultimately required and thereafter scrape the excess paste off the grid during the sizing operation, as discussed below.

The desired thickness of an unpasted grid, and the predetermined amount of paste applied thereto, may vary depending on the particular battery for which the grid is designed. For example, voltage, current, and life cycle requirements for a battery may dictate various grid parameters. However, to ensure uniform current distribution within a battery, it is desirable for each pasted grid in a particular battery be of the same thickness.

An exemplary battery grid has an unpasted thickness in the range of about 0.029" to 0.062", and more particularly about 0.045". After pasting and sizing, the pasted grid has a thickness in the range of 0.050" to 0.056", and particularly about 0.053". Thus, approximately 0.005" of paste is added to the upper surface and approximately 0.003" to 0.005" of paste is added to the lower surface of each grid 12. This represents the desired overpasted condition. It is generally desired that the overpasted thickness (FIG. 4) of a pasted grid exceed the unpasted thickness (FIG. 3) by a maximum of about 0.010".

Paste 28 comprises a mixture of lead oxide or a blend of oxides and a dilute acid solution, for example, sulfuric acid. Reactions occur during paste preparation, producing basic lead sulfate. The lead sulfate is the cementing material which hardens after application to a grid and allows convenient handling of the grids. The specific composition of the paste varies widely for different batteries, and is dictated by battery design, as is known in the art. See, for example, Vimal, George W., *Storage Batteries*, 4th Ed., pp. 27–46.

Figure 5:
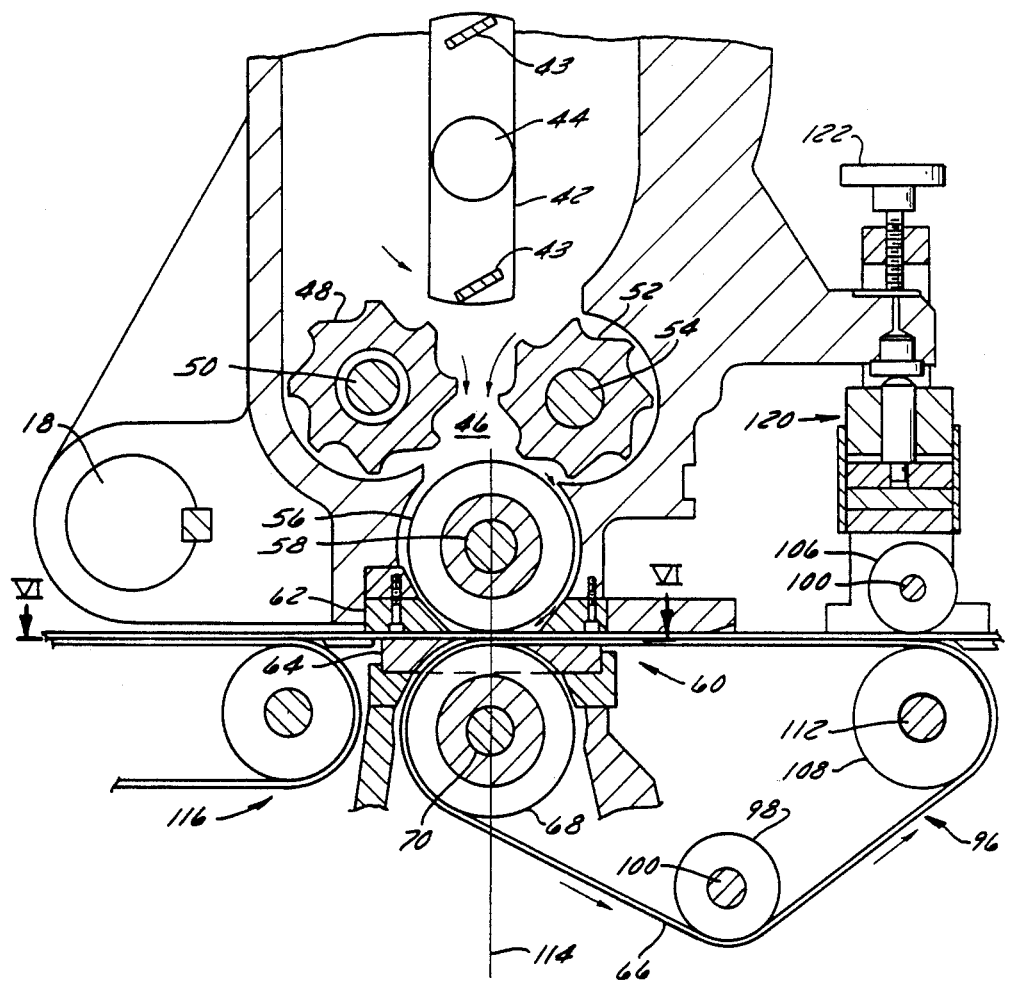
FIG. 5 is a cross-section, side elevation view of a portion of the pasting machine of FIG. 1, showing the belt configuration, orifice plates, and pasting zone.
Figure 7:
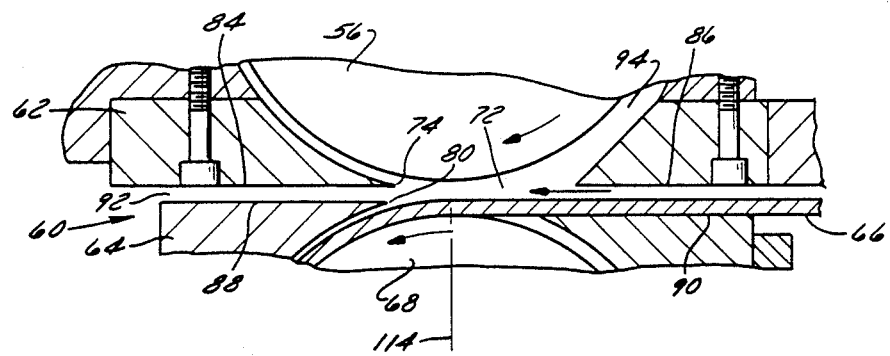
FIG. 7 is an elarged view of the pasting zone and orifice plates shown in FIG. 5.

Referring now to FIGS. 1, 5 and 7, hopper 16 communicates with chute 40, which illustratively comprises a paddle wheel 42 rotatably mounted about an axis 44, a pair of transfer wheels 48 and 52 rotatably mounted about a pair of axes 50, 54, respectively, a paste reservoir 46, and a paste application roller 56 rotatably mounted about an axis 58. The lower end of chute 40 terminates at a paste application zone (pasting zone) 60, wherein paste 28 is applied, typically under pressure, to grids 12.

Figure 6:
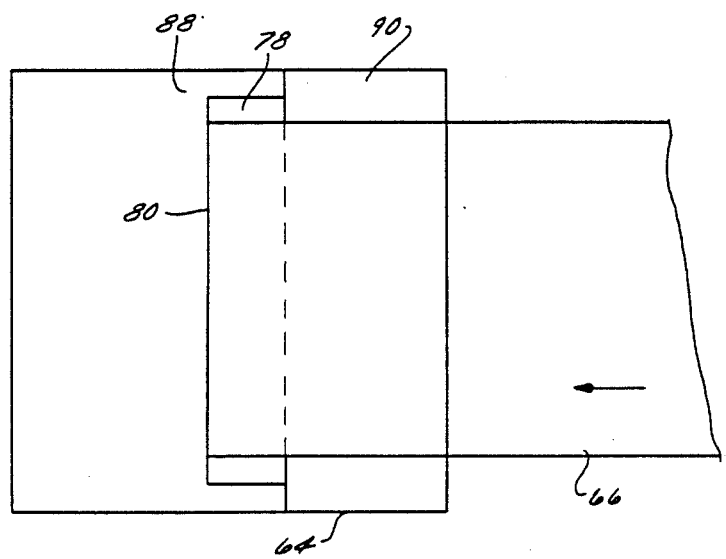
FIG. 6 is a top plan view of the belt and bottom orifice plate taken along line VI—VI of FIG. 5.

With reference to FIGS. 6 and 7, an upper orifice plate 62 comprises a fore surface 84, an aft surface 86, and a transverse slot 72 having a fore edge 74. A lower orifice plate 64 comprises a fore surface 88, a lower aft surface 90, and a transverse slot 78 having a fore edge 80. Upper fore surface 84 and upper aft surface 86 are suitably coplanar, whereas lower aft surface 90 is disposed below lower fore surface 88 of lower plate 64 by an amount approximately equal to or slightly greater than the thickness of an endless conveyor belt 66.

Upper fore surface 84 and lower fore surface 88 define a fixed orifice 92 corresponding to the desired thickness dimension of each pasted grid. With particular reference to FIG. 5, a micrometer assembly 120 controls the height of surface 84, thereby permitting precise adjustment of the size of fixed orifice 92. Micrometer assembly 120 advantageously includes a handle 122 which may be rotated by the operator to establish, in conjunction with conventional mechanical amplification apparatus (not shown), the desired dimension of orifice 92 as is known in the art.

Pasting zone 60 generally comprises the region between plates 62 and 64 "upstream" from fixed orifice 92, namely, the area between respective upper and lower transverse slots 72 and 78. Belt 66 carries grids 12 between respective upper and lower aft surfaces 86 and 90 and into paste application zone 60. After transporting the grids into the pasting zone, and before the grids are urged through orifice 92, belt 66 is guided out of pasting zone 60, as described herein.

Referring again to FIGS. 5 and 7, a gravity-feed system, aided by paddle wheel 42 and transfer wheels 48, 52, urges paste 28 from hopper 16 into a central cavity 46. As paddle wheel 42 rotates counter-clockwise, respective paddles 43 urge paste downwardly between transfer wheels 48, 52, into the central region of cavity 46. Counterrotating transfer wheels 48 and 52 cooperate to urge the paste into contact with the outer surface of application roller 56 and through an arcuate region 94, which region communicates with and terminates at transverse slot 72 of upper orifice plate 62.

As best seen in FIGS. 5 and 6, an endless belt system 96 for driving belt 66 suitably comprises a tension wheel 98 rotatably mounted about an axis 100, a guide wheel (drive roller) 108 rotatably mounted about an axis 112, and a pressure wheel 68 rotatably mounted about axis 70. Belt system 96 is suitably driven by pressure wheel 68. As best seen in FIG. 7, belt system 96 is configured such that belt 66 enters the area between the parallel orifice plate surfaces 86 and 90, passes beneath arcuate region 94, upper plate slot 72 and paste application roller 56, and immediately thereafter descends into lower orifice plate 64 through slot 78. Belt 66 is suitably made from metal, fabric, cotton, rubber, or plastic. Alternatively, belt system 96 may comprise an endless belt system extending from casting machine 14 to pasting machine 100.

In a preferred embodiment of the present invention, a continuous web of grids 12 is introduced into pasting machine 100, for example from continuous casting machine 14 via conveyor 10 (FIG. 1). Alternatively, grids 12 may be introduced in repeat units of one, two, or four grid segments, for example. Grids 12 are transferred from conveyor 10 to continuous belt system 96. A pair of drive rollers 106, 108, rotatably mounted on respective axes 110, 112, is configured to pinch grids 12 as belt 66 pulls the grids therebetween prior to entering the paste zone (FIG. 5).

Referring now to FIGS. 5–7, the flattened grids are pulled into the space between aft surface 86 of upper plate 62 and aft surface 90 of plate 64. As belt 66 progresses, grids 12 are pulled into paste zone 60, i.e., into the zone in which paste 28 (not shown in FIGS. 5–7) is discharged from arcuate region 94. As discussed above, paddle wheel 42, transfer wheels 48, 52, and application roller 56 cooperate to maintain a high pressure flow of paste through arcuate region 94.

In the vicinity of the paste zone, and particularly near a point along an imaginary line 114 joining the centers of rotation of application roller 56 and pressure wheel 68, paste 28 is impressed into and flows through the interstitial spaces of the grids in a manner which completely coats both sides of each grid. The counter-rotating action of roller 56 and pressure wheel 68, in conjunction with the movement of belt 66 and grids 12, ensures that the space between respective aft surfaces 86 and 90 remain substantially free of paste. This paste application process is analogous to inserting unpasted grids into a continuous stream of paste.

It is advantageous to apply more than the desired amount of paste 28 to each grid 12 in the pasting zone and thereafter remove excess paste, thereby minimizing the likelihood of undersized pasted grids. The pasted grids are "sized" as they are urged through fixed orifice 92 between upper plate 62 and lower plate 64. Upon initial paste application, all grids have a thickness greater than the height of fixed orifice 92; similarly, all grids emerging therefrom are of a uniform desired thickness.

In accordance with a preferred embodiment of the invention, belt 66 descends into lower plate 64 at the downstream edge of slot 78. Fore edge 80 of lower slot 78 is configured to scrape the stream of pasted grids from the upper surface of belt 66 as it leaves the pasting zone. Thus, to the extent paste is impressed into the surface of belt 66, particularly at line 114, the paste is immediately removed therefrom. This scraping action obviates the need for a paper web between the grids and the belt. Fore edge 74 of upper slot 72 removes excess paste from application roller 56 in a similar manner.

In accordance with one aspect of the invention, fore edge 80 of lower slot 78 is disposed downstream of line 114. In this way, the grids are pulled, rather than pushed, through the "pinching" region (line 114) of the pasting zone, a process which is largely independent of the beam strength of the grids. This is especially advantageous when the grids are thin, soft, or at an elevated temperate, for example.

In accordance with a preferred embodiment of the invention, a method for pasting grids is provided whereby a grid having a low compression strength is pulled by a conveyor belt into the pasting zone in a manner tending to minimize the incidence of grid buckling. Once the grid is pulled beyond the zone in which high resistance to forward travel is encountered, the conveyor belt is guided out of the pasting zone, and the pasted grids are removed from the belt. Upon being separated from the belt, the pasted grids are directed through the sizing orifice.

Figure 9:
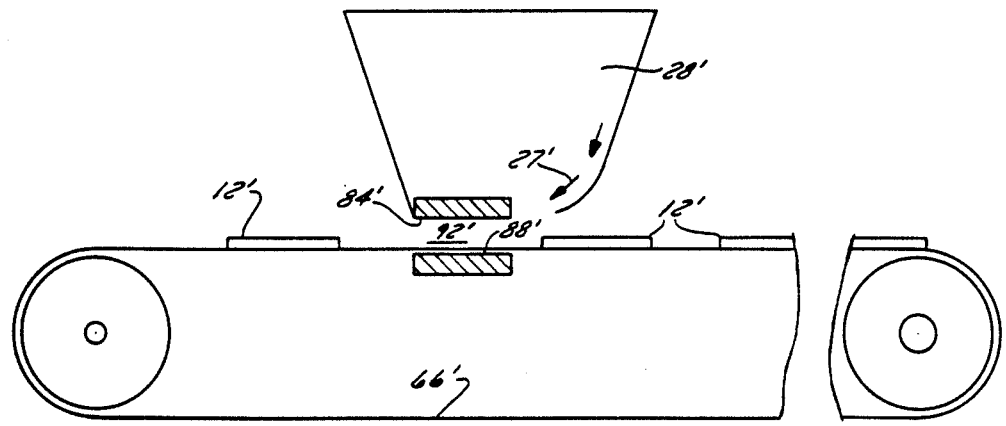
FIG. 9 is a schematic view of a continuous pass-through belt configuration of the prior art.

In presently known pasting machines employing belt conveyors (see prior art FIG. 9), the grids 12' remain in contact with the travelling belt 66' as the grids pass between orifice plates 84', 88' comprising a paste application zone 92'. Paste 28' is impressed onto the upper surface of the grids 12' (as indicated by the arrows 27') and flows through the interstitial spaces within the grid, coating both the upper surface and underside of each grid 12'. High pressure application of the moist paste causes the pasted grid to adhere to belt 66'.

A stationary cutoff wire (not shown) is typically disposed transversely across the surface of the belt to facilitate subsequent removal of the pasted grids therefrom. Use of a cutoff wire, however, tends to produce localized regions of concavity generally corresponding to the interstitial spaces on the underside of the grid, resulting in non-uniform paste distribution and concomitant reduction in voltaic potential of the finished battery. Furthermore, use of a cutoff wire limits the extent to which the underside of the grid can be effectively overpasted.

Figure 8:
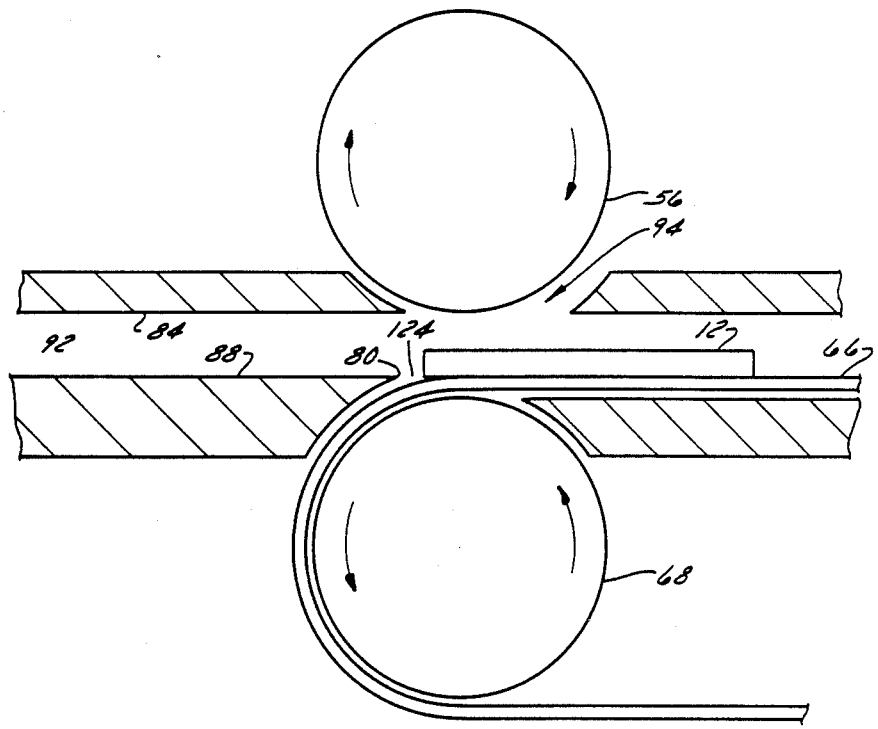
FIG. 8 is a schematic view of an exemplary grid shown passing through the paste application zone.

With reference to FIGS. 5, 7, and 8, these and other shortcomings are alleviated in accordance with one aspect of the invention. As best seen in FIG. 8, belt 66 descends through slot 78 while the grid is still within the paste application zone. Fore edge 80 of lower slot 78 removes paste from the upper surface of belt 66 as it passes between wheel 68 and edge 80. As a result, a cushion of paste is created in a pocket 124 between grid 12 and belt 66 in the vicinity of edge 80, facilitating the transfer of grid 12 onto surface 88 of orifice 92. Pressurized paste from application roller 56 passes through grid 12 into pocket 124, thereby ensuring that the underside of grid 12 is evenly coated with paste.

Inasmuch as paste is simultaneously supplied to both the upper and lower surfaces of grid 12 as it enters orifice 92, grid 12 essentially passes therethrough in a stream of paste. Ideally, grid 12 should be centered within the stream, such that the grid is overpasted by an equal amount, for example 0.005", on both the upper and lower grid surfaces. In practice, however, the amount of paste on the upper surface typically exceeds the amount on the lower surface.

The cushion of paste which accumulates at pocket 124 and lifts grid 12 off of belt 66 is scraped off belt 66 by fore edge 80, thus rendering cutoff wires and other means for removing the grid from the belt unnecessary. As a result, paste is uniformly distributed over the lower surface of the grids due to the elimination of the localized concavity in the interstitial spaces of the grids associated with cutoff wires.

The sized, pasted grids are extruded from fixed orifice 92 and carried away, for example, by a collector 116 (FIG. 5), which may be a conveyor similar to belt conveyor system 96. Collector 116 beneficially comprises a mesh, chain, or cloth carrier inasmuch as freshly pasted grids may adhere to a smooth, flat belt surface.

In accordance with another aspect of the invention, hopper 16, and hence chute 40, may be refilled intermittently without interrupting the pasting process. Moreover, endless conveyor system 96, collector 116, and the virtual elimination of low beam strength related-buckling combine to yield a continuous, automated pasting process. Thus, productivity is enhanced due to the continuous nature of the above-described pasting process.

In accordance with a further aspect of the invention, a principle advantage of a belt drive system, namely, pulling rather than pushing the grids, is employed in conjunction with a fixed-plate orifice so that the belt does not pass through the fixed orifice. The grids are thus pulled by a belt, through the paste application zone, yet the belt leaves the pasting zone prior to the sizing operation. As a result, dimensional integrity and repeatability of pasted part thickness dimensions is enhanced, reducing scrap and out-of-tolerance parts.

It will be understood that the above description is of a preferred exemplary embodiment of the present invention, and that the invention is not limited to the specific forms shown. For example, the belt-scraping edge of the bottom orifice plate may be disposed further downstream, or upstream to the other side of the line joining the centers of the paste application roller and pressure wheel. The stream of paste would play a larger role in urging the grids beyond the "pinch" zone. Various other substitutions, modifications, changes, and omissions may be made in the design and arrangement of the elements without departing from the spirit of the invention as expressed in the appended claims.

We claim:

1. A method of applying paste to a battery grid, comprising the steps of:
    guiding a conveyor belt into a paste application zone within a pasting machine;
    carrying said grid, in an unpasted condition, on said conveyor belt into said paste application zone;
    applying paste to a surface of said grid;
    transferring said pasted grid from said belt to a fixed orifice; and
    urging said pasted grid through said orifice to thereby impart a predetermined thickness to said pasted grid.

2. The method of claim 1, wherein said applying step comprises enveloping said grid within a stream of said paste.

3. The method of claim 1, wherein said carrying step comprises pulling said grid into a pressurized paste application zone.

4. The method of claim 1, wherein said applying step comprises continuously feeding paste into said paste application zone.

5. The method of claim 1, further comprising the step of guiding said belt out of said paste application zone during said applying step.

6. The method of claim 1, further comprising the step of guiding said belt out of said paste application zone after said applying step.

7. The method of claim 1, wherein said transferring step comprises guiding said belt out of said paste application zone.

8. The method of claim 7, further comprising the step of scraping paste from a surface of said belt intermediate said paste application zone and said orifice.

9. An apparatus for applying paste to a thin, flat grid, comprising:
    application means for impressing paste onto a surface of said grid;
    a conveyor belt for carrying said grid into and out of engagement with said application means;

orifice means for removing excess paste from said grid such that said pasted grid is of predetermined thickness;

wherein said orifice means consists of two stationary, flat, parallel surfaces.

10. An apparatus for applying paste to a battery grid, comprising:

conveyor means for introducing said grid into said apparatus;

a paste application zone including means for applying said paste to said grid while said grid is being carried by said conveyor means;

orifice means for removing a portion of said paste from said pasted grid such that said pasted grid emerges from said orifice means with a predetermined thickness;

means for separating said pasted grid from said conveyor means intermediate said paste application zone and said orifice means.

11. The apparatus of claim 10 wherein said orifice means comprises an upper plate having a downward facing surface and a lower plate having an upward facing surface disposed opposite said downward surface and defining a fixed orifice therebetween.

12. The apparatus of claim 11 wherein said conveyor means comprises a belt configured to transport said grids into said paste application zone and into engagement with said orifice means.

13. The apparatus of claim 12, wherein said conveyor means further comprises means for guiding said belt out of said paste application zone and means for supporting said belt and said grid in said paste application zone.

14. The apparatus of claim 12, wherein said separating means comprises means, disposed intermediate said paste application zone and said orifice means, for scraping paste from said belt.

15. The apparatus of claim 10, wherein said orifice means consists of an upper plate having a downward facing surface and a lower plate having an upward facing surface parallel to and disposed opposite said downward facing surface.

16. The apparatus of claim 10 further comprising a collector means for collecting said pasted grids upon being discharged from said orifice means.

17. The apparatus of claim 10 wherein said applying means comprises means for enveloping said grid within said paste.

18. A method of applying paste to a battery grid, comprising the steps of:

carrying said grid, in an unpasted condition, on a conveyor belt into a paste application zone within a pasting machine;

applying paste to a surface of said grid;

transferring said pasted grid from said belt to a fixed orifice;

guiding said belt out of said paste application zone;

scraping paste from a surface of said belt intermediate said paste application zone and said orifice; and urging said pasted grid through said orifice to thereby impart a predetermined thickness to said pasted grid;

wherein said transferring scrap comprises accumulating a pocket of scraped paste between said pasted grid and said belt, thereby lifting said grid from said belt into said orifice.

19. The method of claim 18 wherein said applying step comprises passing said paste through said grid.

20. A method of applying paste to a battery grid, comprising the steps of:

carrying said grid, in an unpasted condition, on a conveyor belt into a pressurized paste application zone within a pasting machine;

applying paste to a surface of said grid;

transferring said pasted grid from said belt to a fixed orifice;

urging said pasted grid through said orifice to thereby impart a predetermined thickness to said pasted grid;

said carrying step further comprising the step of pulling said grid into said paste application zone; and said urging step further comprising the step of urging said grid through said orifice with said paste pressure.

* * * * *